(12) United States Patent
Machita et al.

(10) Patent No.: US 7,948,718 B2
(45) Date of Patent: May 24, 2011

(54) MAGNETORESISTIVE HEAD HAVING AN INSULATING LAYER WITH A PARTICULAR COMPRESSIVE STRESS

(75) Inventors: Takahiko Machita, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1836 days.

(21) Appl. No.: 11/078,580

(22) Filed: Mar. 14, 2005

(65) Prior Publication Data
US 2005/0219766 A1 Oct. 6, 2005

(30) Foreign Application Priority Data

Apr. 2, 2004 (JP) ................................. 2004-109712

(51) Int. Cl.
*G11B 5/39* (2006.01)
(52) U.S. Cl. ................................. 360/324.1; 360/324.11
(58) Field of Classification Search ............... 360/324.1, 360/324.11, 324.12, 324.2
See application file for complete search history.

(56) References Cited

U.S. PATENT DOCUMENTS

| | | | |
|---|---|---|---|
| 5,583,725 A | 12/1996 | Coffey et al. | |
| 6,210,818 B1 * | 4/2001 | Saito | 428/811.2 |
| 7,282,755 B2 * | 10/2007 | Pakala et al. | 257/295 |
| 2005/0018365 A1 * | 1/2005 | Gill | 360/324.11 |
| 2005/0180057 A1 * | 8/2005 | Freitag et al. | 360/324.1 |
| 2005/0180061 A1 * | 8/2005 | Ding et al. | 360/324.12 |
| 2005/0219770 A1 * | 10/2005 | Gill | 360/324.2 |
| 2005/0280955 A1 * | 12/2005 | Hasegawa et al. | 360/324.11 |
| 2007/0188945 A1 * | 8/2007 | Fuji et al. | 360/324.12 |
| 2007/0195468 A1 * | 8/2007 | Freitag et al. | 360/324.11 |

FOREIGN PATENT DOCUMENTS

| | | |
|---|---|---|
| JP | A 08-007235 | 1/1996 |
| JP | A-10-302227 | 11/1998 |
| JP | A 2000-113418 | 4/2000 |
| JP | A 2000-276714 | 10/2000 |
| JP | A 2002-100011 | 4/2002 |

* cited by examiner

*Primary Examiner* — Jefferson Evans
(74) *Attorney, Agent, or Firm* — Oliff & Berridge, PLC

(57) ABSTRACT

An MR element incorporates: a nonmagnetic conductive layer having two surfaces facing toward opposite directions; a free layer disposed adjacent to one of the surfaces of the nonmagnetic conductive layer, wherein the direction of magnetization in the free layer changes in response to an external magnetic field; and a pinned layer disposed adjacent to the other of the surfaces of the nonmagnetic conductive layer, wherein the direction of magnetization in the pinned layer is fixed to the direction orthogonal to the air bearing surface. The MR element does not include any layer provided for fixing the direction of magnetization in the pinned layer. The pinned layer incorporates a ferromagnetic layer made of a ferromagnetic material having a positive magnetostriction constant. A bottom shield gap film and a top shield gap film disposed adjacent to the MR element each have a compressive stress of 600 MPa or greater.

6 Claims, 8 Drawing Sheets

MAGNETORESISTIVE HEAD HAVING AN INSULATING LAYER WITH A PARTICULAR COMPRESSIVE STRESS

BACKGROUND OF THE INVENTION

1. Field of the Invention

The present invention relates to a thin-film magnetic head comprising a magnetoresistive element, and to a head gimbal assembly and a hard disk drive each incorporating the thin-film magnetic head.

2. Description of the Related Art

Performance improvements in thin-film magnetic heads have been sought as areal recording density of hard disk drives has increased. A widely used type of thin-film magnetic head is a composite thin-film magnetic head that has a layered structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements.

A typical spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

As disclosed in the Published Unexamined Japanese Patent Application Heisei 8-7235 (1996), the Published Unexamined Japanese Patent Application 2000-276714, and the Published Unexamined Japanese Patent Application 2000-113418, for example, spin-valve GMR elements have been proposed, each of the GMR elements including a pinned layer in which the direction of magnetization is fixed independently of the function of any other layer such as the antiferromagnetic layer, and including no antiferromagnetic layer. In each of the GMR elements disclosed in the above-mentioned publications, the pinned layer incorporates two ferromagnetic layers and a thin coupling layer disposed between the ferromagnetic layers. In the pinned layer, the two ferromagnetic layers are coupled to each other antiferromagnetically, that is, coupled to each other such that the directions of magnetization therein are anti-parallel.

As disclosed in the Published Unexamined Japanese Patent Application 2002-100011, for example, in a GMR head, typically, the GMR element is located between two shield layers disposed on top and bottom thereof. An insulating film is provided between the GMR element and each of the shield layers. Bias field applying layers are disposed on both sides of the GMR element that are opposed to each other in the direction of track width. The bias field applying layers apply a bias magnetic field to the free layer. The bias magnetic field directs the magnetization in the free layer to the direction of track width while no signal magnetic field sent from the recording medium is applied to the free layer. The magnetization in the pinned layer is fixed to the direction orthogonal to a medium facing surface of the head that faces toward the recording medium. Consequently, an angle of 90 degrees is maintained between the direction of magnetization in the pinned layer and the direction of magnetization in the free layer while no signal field sent from the recording medium is applied to the free layer. If a signal field in the direction orthogonal to the medium facing surface is sent from the recording medium and applied to the GMR head, the direction of magnetization in the free layer is changed, and the angle between the direction of magnetization in the pinned layer and the direction of magnetization in the free layer is thereby changed. The electrical resistance of the GMR element is changed by this angle. Therefore, it is possible to read data stored on the medium by detecting the change in electrical resistance of the GMR element.

To achieve higher recording density, it is preferred that the read gap length, that is, the distance between the two shield layers of the GMR head, is small. The above-mentioned GMR element that includes no antiferromagnetic layer is suitable for achieving higher recording density since this GMR element is capable of making the read gap length smaller, compared with the GMR element including the antiferromagnetic layer.

In the GMR head using the GMR element incorporating the pinned layer in which the direction of magnetization is fixed independently of the function of any other layer, an induced magnetic anisotropy is given to the pinned layer by magnetizing the pinned layer such that the direction of magnetization in the pinned layer is orthogonal to the medium facing surface. For this GMR head it is also required to magnetize the bias field applying layers such that the magnetization in the bias field applying layers is directed to the direction of track width. The magnetic field required for magnetizing the pinned layer is greater than the magnetic field required for magnetizing the bias field applying layers. For example, the magnetic field required for magnetizing the pinned layer is about 5 to 10 kOe (5×79.6 kA/m to 10×79.6 kA/m) while the magnetic field required for magnetizing the bias field applying layers is about 1.5 kOe (1.5×79.6 kA/m). Therefore, magnetizing of the bias field applying layers should be performed after magnetizing the pinned layer.

In the GMR head using the GMR element incorporating the pinned layer in which the direction of magnetization is fixed independently of the function of any other layer, the direction of magnetization in the pinned layer should not be changed when the bias field applying layers are magnetized. In the actual manufacturing process of such heads, however, it is difficult to sufficiently increase the induced magnetic anisotropy of the pinned layer. As a result, the directions of magnetization in the pinned layers in some of the heads are changed when the bias field applying layers are magnetized. Such heads in which the directions of magnetization in the pinned layers are changed exhibit a reduction in output. If the reduction in output is beyond the permissible range, the head is rated as a nonconforming product.

As disclosed in the Published Unexamined Japanese Patent Application 2000-113418, it is known that tensile stress in the direction orthogonal to the medium facing surface exists as internal stress in the GMR element in the GMR head. This publication thus discloses that the ferromagnetic film making up the pinned layer should have a positive magnetostriction constant. If the ferromagnetic film making up the pinned layer has a positive magnetostriction constant, a magnetic anisotropy that directs the magnetization to the direction orthogonal to the medium facing surface is generated in the pinned layer, in response to the above-mentioned tensile stress, by the inverse magetostrictive effect. This magnetic anisotropy enhances the fixing of the direction of magnetization in the pinned layer.

However, in the GMR head using the GMR element incorporating the pinned layer in which the direction of magnetization is fixed independently of the function of any other layer, it is difficult to sufficiently enhance the fixing of the direction of magnetization in the pinned layer only by making the ferromagnetic film making up the pinned layer have a positive magnetostriction constant.

OBJECT AND SUMMARY OF THE INVENTION

It is an object of the invention to provide a thin-film magnetic head capable of enhancing the fixing of the direction of magnetization in a pinned layer while the head uses a spin-valve magnetoresistive element incorporating the pinned layer in which the direction of magnetization is fixed independently of the function of any other layer, and to provide a head gimbal assembly and a hard disk drive each incorporating the thin-film magnetic head.

A thin-film magnetic head of the invention comprises: a medium facing surface that faces toward a recording medium; a magnetoresistive element disposed near the medium facing surface and having a first surface and a second surface that face toward opposite directions and intersect the medium facing surface; and an insulating film disposed adjacent to the first or second surface of the magnetoresistive element. The magnetoresistive element incorporates: a nonmagnetic conductive layer having two surfaces facing toward opposite directions; a free layer disposed adjacent to one of the surfaces of the nonmagnetic conductive layer, wherein the direction of magnetization in the free layer changes in response to an external magnetic field; and a pinned layer disposed adjacent to the other of the surfaces of the nonmagnetic conductive layer, wherein the direction of magnetization in the pinned layer is fixed to the direction orthogonal to the medium facing surface independently of a function of any other layer. The pinned layer incorporates a layer made of a ferromagnetic material having a positive magnetostriction constant. The insulating film has a compressive stress of 600 MPa or greater.

In the thin-film magnetic head of the invention, the insulating film disposed adjacent to the first or second surface of the magnetoresistive element has a compressive stress of 600 MPa or greater, so that a great tensile stress is given to the pinned layer. As a result, in the pinned layer incorporating a layer made of a ferromagnetic material having a positive magnetostriction constant, the magnetic anisotropy that directs the magnetization to the direction orthogonal to the medium facing surface is enhanced, and the fixing of the direction of magnetization in the pinned layer is thereby enhanced.

In the thin-film magnetic head of the invention, the direction of magnetization in the free layer may be directed to the direction of track width while no external magnetic field is applied to the free layer.

In the thin-film magnetic head of the invention, the insulating film may contain any of $SiO_2$, SiC, SiN, AlN, TiO and BN as a material thereof.

In the thin-film magnetic head of the invention, the magnetoresistive element may incorporate: the free layer; a first nonmagnetic conductive layer and a second nonmagnetic conductive layer; and a first pinned layer and a second pinned layer. In this case, the free layer has two surfaces facing toward opposite directions. The first nonmagnetic conductive layer has two surfaces facing toward opposite directions, and is disposed such that one of the surfaces is adjacent to one of the surfaces of the free layer. The second nonmagnetic conductive layer has two surfaces facing toward opposite directions, and is disposed such that one of the surfaces is adjacent to the other of the surfaces of the free layer. The first pinned layer is disposed adjacent to the other of the surfaces of the first nonmagnetic conductive layer. The second pinned layer is disposed adjacent to the other of the surfaces of the second nonmagnetic conductive layer. At least one of the first and second pinned layers is such a pinned layer that the direction of magnetization therein is fixed to the direction orthogonal to the medium facing surface independently of a function of any other layer.

A head gimbal assembly of the invention comprises: a slider incorporating the thin-film magnetic head of the invention and disposed to face toward a recording medium; and a suspension flexibly supporting the slider.

A hard disk drive of the invention comprises: a slider incorporating the thin-film magnetic head of the invention and disposed to face toward a circular-plate-shaped recording medium that is rotated and driven; and an alignment device supporting the slider and aligning the slider with respect to the recording medium.

According to the invention, the insulating film disposed adjacent to the first or second surface of the magnetoresistive element has a compressive stress of 600 MPa or greater, so that a great tensile stress is given to the pinned layer. As a result, in the pinned layer incorporating a layer made of a ferromagnetic material having a positive magnetostriction constant, the magnetic anisotropy that directs the magnetization to the direction orthogonal to the medium facing surface is enhanced. Therefore, according to the invention, it is possible to enhance the fixing of the direction of magnetization in the pinned layer while the thin-film magnetic head uses the spin-valve magnetoresistive element incorporating the pinned layer in which the direction magnetization is fixed independently of the function of any other layer.

Other and further objects, features and advantages of the invention will appear more fully from the following description.

DETAILED DESCRIPTION OF THE PREFERRED EMBODIMENTS

First Embodiment

Figure 3:
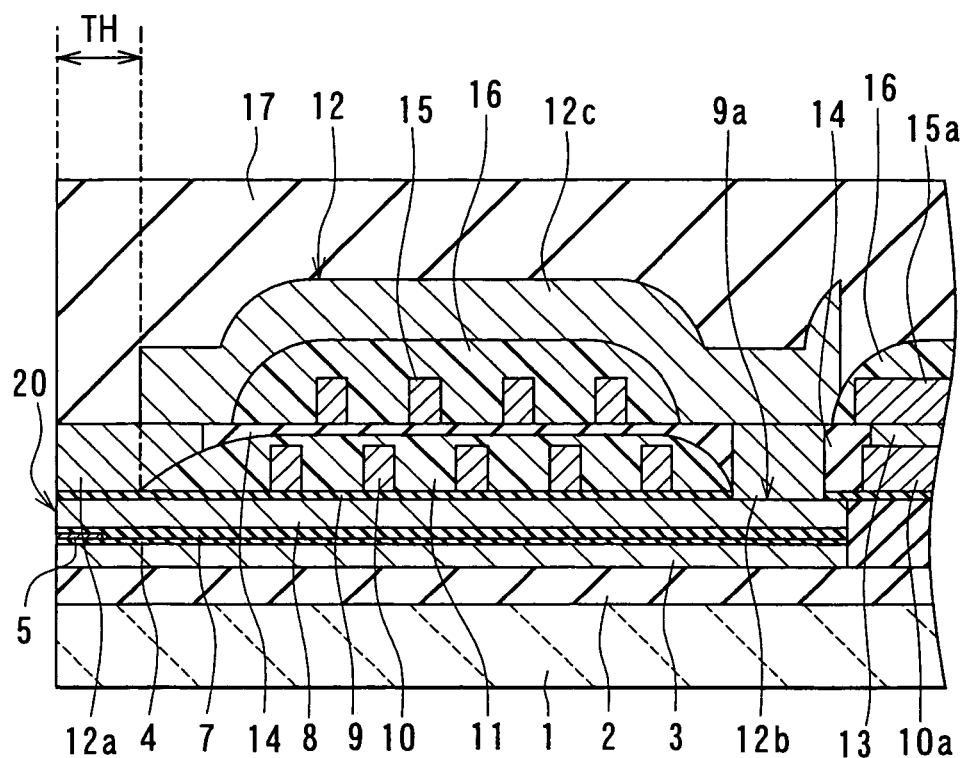
FIG. 3 is a cross-sectional view of a thin-film magnetic head of the first embodiment of the invention, wherein the cross section is orthogonal to the air bearing surface and the substrate.
Figure 4:
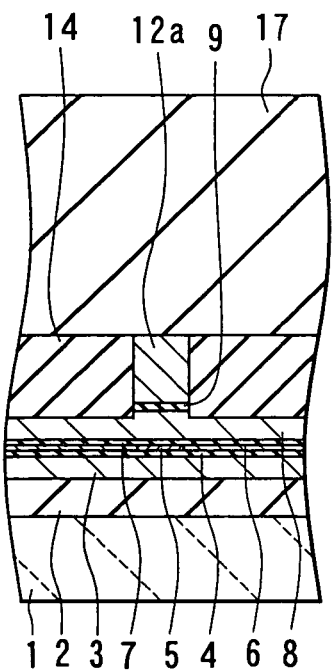
FIG. 4 is a cross-sectional view of the pole portion of the thin-film magnetic head of the first embodiment of the invention, wherein the cross section is parallel to the air bearing surface.

Preferred embodiments of the invention will now be described in detail with reference to the accompanying drawings. Reference is now made to FIG. 3 and FIG. 4 to describe the outlines of the configuration and a manufacturing method of a thin-film magnetic head of a first embodiment of the invention. FIG. 3 illustrates a cross section of the thin-film magnetic head orthogonal to the air bearing surface and a substrate. FIG. 4 illustrates a cross section of a pole portion of the thin-film magnetic head parallel to the air bearing surface.

In the method of manufacturing the thin-film magnetic head of the embodiment, first, an insulating layer 2 made of an insulating material such as alumina ($Al_2O_3$) and having a thickness of 1 to 5 μm, for example, is formed by a method such as sputtering on a substrate 1 made of a ceramic such as aluminum oxide and titanium carbide ($Al_2O_3$—TiC). Next, a bottom shield layer 3 for a read head made of a magnetic material such as Permalloy (NiFe) and having a thickness of approximately 3 μm, for example, is formed on the insulating layer 2 by a method such as sputtering or plating.

Next, a bottom shield gap film 4 made of an insulating material and having a thickness of 10 to 200 nm, for example, is formed on the bottom shield layer 3 by a method such as sputtering. Next, an MR element 5 for reading, a pair of bias field applying layers not shown and a pair of electrode layers 6 each of which has a thickness of tens of nanometers are formed on the bottom shield gap film 4. Next, a top shield gap film 7 made of an insulating material and having a thickness of 10 to 200 nm, for example, is formed on the bottom shield gap film 4 and the MR element 5 by a method such as sputtering.

Figure 13:
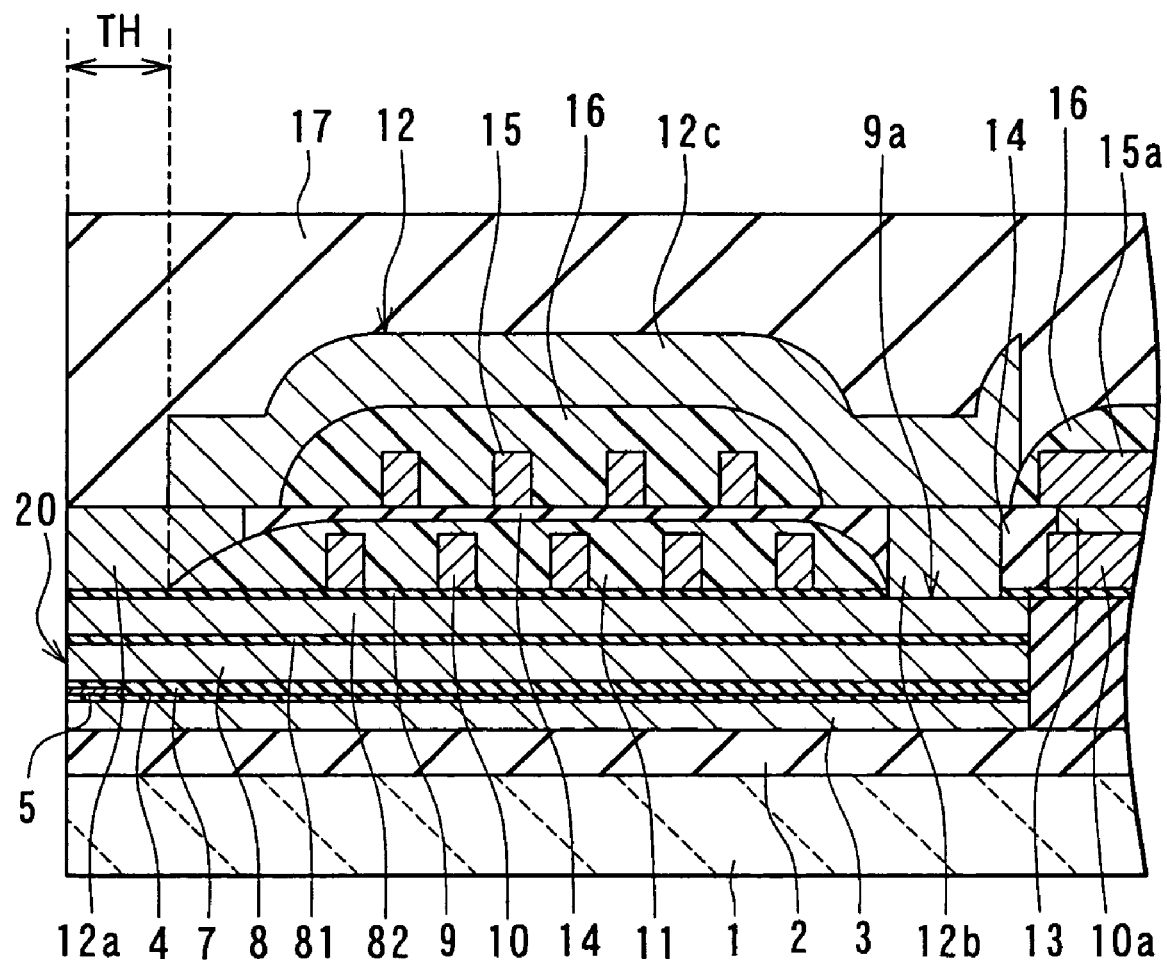
FIG. 13 is a cross-sectional view of a thin-film magnetic head of a modification example of the first embodiment of the invention, wherein the cross section is orthogonal to the air bearing surface and the substrate.
Figure 14:
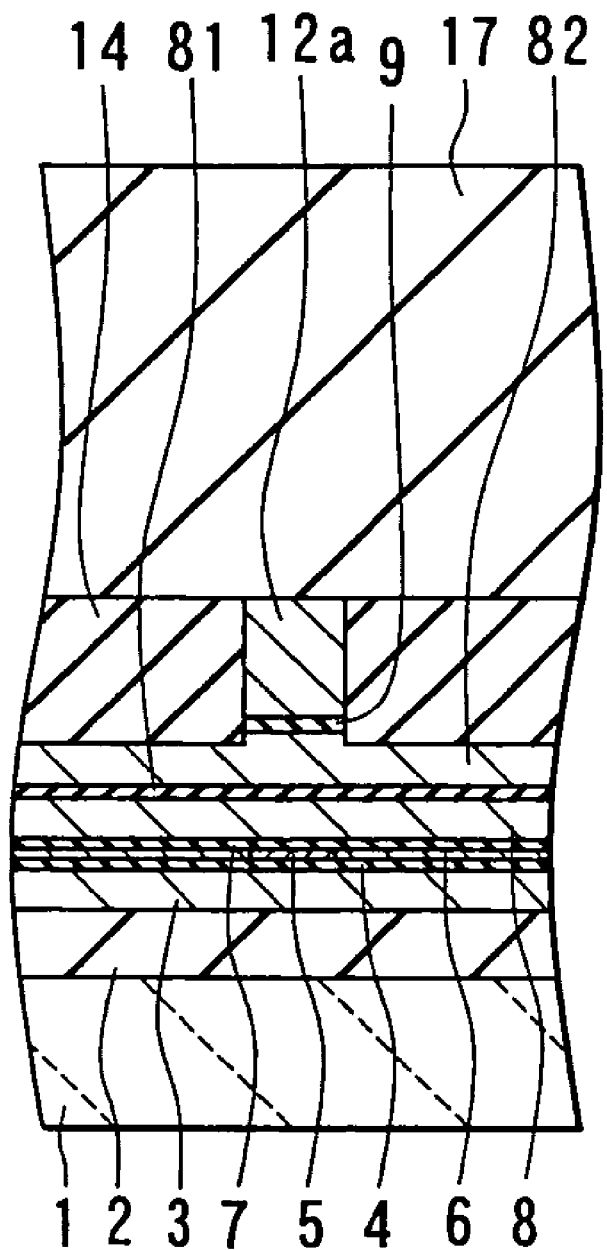
FIG. 14 is a cross-sectional view of the pole portion of the thin-film magnetic head of the modification example of the first embodiment of the invention, wherein the cross section is parallel to the air bearing surface.

Next, a top shield layer 8 for the read head is formed on the top shield gap film 7. The top shield layer 8 is made of a magnetic material and has a thickness of 3 to 4 μm, for example, and also functions as a bottom pole layer of a write head. The top shield layer 8 is made of a soft magnetic material such as NiFe, CoFe, CoFeNi or FeN. The top shield layer 8 is formed by plating or sputtering, for example. Alternatively, as shown in FIG. 13 and FIG. 14, a top shield layer 8 that does not function as the bottom pole layer, a separating layer 81 and a bottom pole layer 82 may be provided in place of the top shield layer 8 that also functions as the bottom pole layer. The separating layer 81 is made of a nonmagnetic material such as alumina and formed by sputtering, for example, on the top shield layer 8 that does not function as the bottom pole layer. The bottom pole layer 82 is formed on the separating layer 81. The separating layer 81 may be a nonmagnetic conductive layer.

Next, a write gap layer 9 made of a nonmagnetic material such as alumina and having a thickness of 50 to 300 nm, for example, is formed on the top shield layer 8 (or the bottom pole layer 82) by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 μm, for example, is formed on the write gap layer 9. In FIG. 3, numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat processing is performed at a specific temperature to flatten the surface of the insulating layer 11. Through this heat processing, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a and a connecting layer 13 made of a magnetic material is formed on the connecting portion 10a at the same time. The coupling portion layer 12b makes up a portion of the top pole layer 12 that is magnetically coupled to the top shield layer 8 (or the bottom pole layer 82).

Next, pole trimming is performed. That is, in a region around the track width defining layer 12a, the write gap layer 9 and at least a portion of the pole portion of the top shield layer 8 (or the bottom pole layer 82) close to the write gap layer 9 are etched, using the track width defining layer 12a as a mask. As a result, as shown in FIG. 4, a trim structure is formed, wherein the pole portion of the top pole layer 12, the write gap layer 9 and at least a portion of the pole portion of the top shield layer 8 (or the bottom pole layer 82) have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 µm, for example, is formed over the entire surface. The insulating layer 14 is then polished by chemical mechanical polishing, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 µm, for example, is formed on the flattened insulating layer 14. In FIG. 3, numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat processing is performed at a specific temperature to flatten the surface of the insulating layer 16. Through this heat processing, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. One of the ends of the yoke portion layer 12c closer to the air bearing surface 20 is located at a distance from the air bearing surface 20. The yoke portion layer 12c is connected to the top shield layer 8 (or the bottom pole layer 82) through the coupling portion layer 12b.

Next, an overcoat layer 17 made of alumina, for example, is formed to cover the entire surface. Finally, machining of the slider including the foregoing layers is performed to form the air bearing surface 20 of the thin-film magnetic head including the write head and the read head. The thin-film magnetic head is thus completed.

The thin-film magnetic head thus manufactured comprises the air bearing surface 20 as the medium facing surface that faces toward a recording medium, the read head and the write head. The read head incorporates: the MR element 5 disposed near the air bearing surface 20; and the bottom shield layer 3 and the top shield layer 8 for shielding the MR element 5, wherein portions of the bottom shield layer 3 and the top shield layer 8 close to the air bearing surface 20 are opposed to each other with the MR element 5 disposed in between.

The write head incorporates the bottom pole layer (the top shield layer 8 or the bottom pole layer 82) and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer and the pole portion of the top pole layer 12; and the thin-film coil including the portions 10 and 15 at least part of which is placed between the bottom pole layer and the top pole layer 12 and insulated from the bottom pole layer and the top pole layer 12. In the thin-film magnetic head, as shown in FIG. 3, throat height TH is the length from the air bearing surface 20 to the end of the insulating layer 11 closer to the air bearing surface 20. The throat height is the length (height) from the air bearing surface 20 to the point at which the distance between the two pole layers starts to increase.

Figure 1:
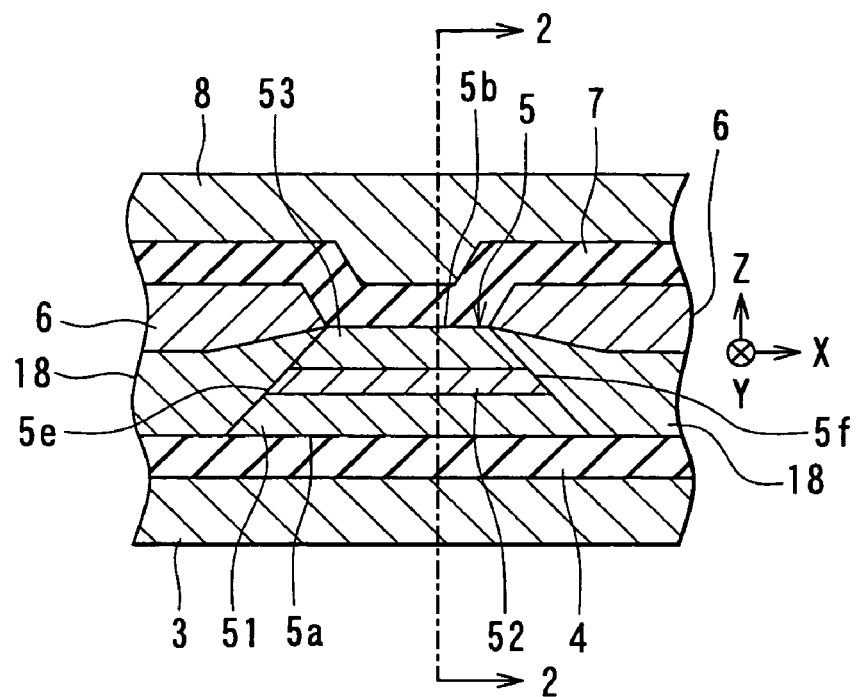
FIG. 1 is a cross-sectional view of a read head of a first embodiment of the invention, wherein the cross section is parallel to the air bearing surface.
Figure 2:
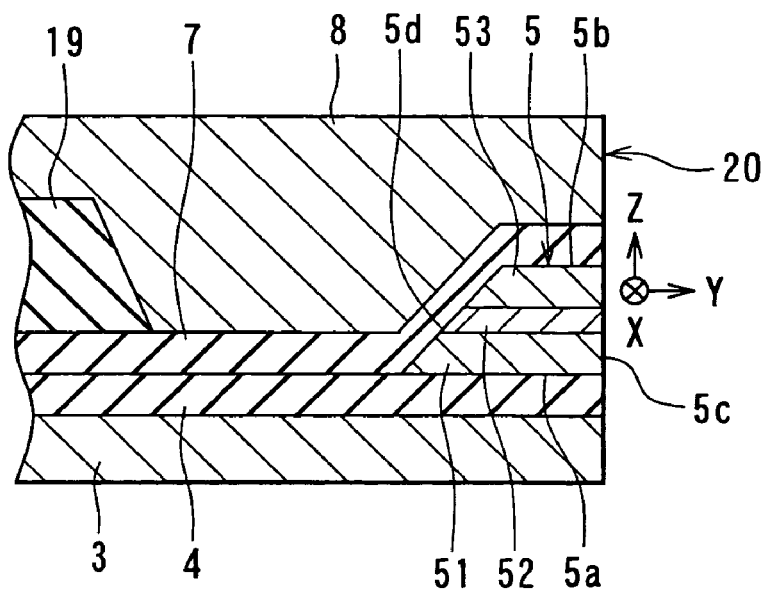
FIG. 2 is a cross-sectional view taken along line 2-2 of FIG. 1.

Reference is now made to FIG. 1 and FIG. 2 to describe details of the configuration of the read head of the embodiment. FIG. 1 is a cross-sectional view of the read head, wherein the cross section is parallel to the air bearing surface. FIG. 2 is a cross-sectional view taken along line 2-2 of FIG. 1. In FIG. 1 and FIG. 2, an X direction is the direction of track width, that is, the direction parallel to the air bearing surface 20 and parallel to surfaces 5a and 5b of the MR element 5. A Y direction is the direction orthogonal to the air bearing surface 20. A Z direction is the direction orthogonal to the X direction and the Y direction.

The read head comprises: the bottom shield layer 3 and the top shield layer 8 disposed at a specific distance from each other; the MR element 5 disposed between the bottom shield layer 3 and the top shield layer 8; the bottom shield gap film 4 disposed between the bottom shield layer 3 and the MR element 5; and the top shield gap film 7 disposed between the top shield layer 8 and the MR element 5. An insulating layer 19 made of an insulating material such as alumina is formed between the top shield gap film 7 and the top shield layer 8 except the region in which the MR element 5 is disposed and part of the region around this region.

The MR element 5 has: a first surface (a bottom surface) 5a and a second surface (a top surface) 5b that face toward opposite directions and that are disposed to intersect the air bearing surface 20; a first end 5c located in the air bearing surface 20; a second end 5d located opposite to the first end 5c; and two side portions 5e and 5f. The bottom shield gap film 4 is disposed adjacent to the first surface 5a of the MR element 5. The top shield gap film 7 is disposed adjacent to the second surface 5b of the MR element 5. The bottom shield gap film 4 and the top shield gap film 7 each correspond to the insulating film of the invention.

The end 5d is tilted such that the distance between the ends 5c and 5d decreases toward an upper portion of the MR element 5. The side portions 5e and 5f are tilted, too, such that the distance between the side portions 5e and 5f decreases toward the upper portion of the MR element 5.

The read head further comprises: the two bias field applying layers 18 that are disposed adjacent to the side portions 5e and 5f of the MR element 5 and apply a bias magnetic field to the MR element 5; and the two electrode layers 6 that are disposed adjacent to the top surfaces of the bias field applying layers 18 and feed a sense current for detecting signals to the MR element 5. Although the electrode layers 6 are disposed on top of the bias field applying layers 18 in FIG. 1, the electrode layers 6 are disposed on the bottom shield gap film 4 in a region in which the bias field applying layers 18 do not exist. The bias field applying layers 18 and the electrode layers 6 are disposed between the bottom shield gap film 4 and the top shield gap film 7.

The bias field applying layers 18 are each made of a hard magnetic layer (a hard magnet) or a layered structure made up of a ferromagnetic layer and an antiferromagnetic layer, for example. The electrode layers 6 are each made of a layered structure made up of a Ta layer and an Au layer, a layered structure made up of a TiW layer and a Ta layer, or a layered structure made up of a TiN layer and a Ta layer, for example.

The bias field applying layers 18 are magnetized such that the magnetization in the bias field applying layers 18 is directed to the direction of track width, and apply a bias magnetic field in the direction of track width to the MR element 5.

The MR element 5 incorporates: a nonmagnetic conductive layer 52 having two surfaces facing toward opposite directions; a free layer 53 disposed adjacent to one of the surfaces of the nonmagnetic conductive layer 52, wherein the direction of magnetization in the free layer 53 changes in response to an external magnetic field; and a pinned layer 51 disposed adjacent to the other of the surfaces of the nonmagnetic conductive layer 52, wherein the direction of magnetization in the pinned layer 51 is fixed to the direction orthogonal to the air bearing surface 20. However, the MR element 5 does not include any other layer, such as an antiferromagnetic layer, for fixing the direction of magnetization in the pinned layer 51. The direction of magnetization in the pinned layer 51 is fixed independently of the function of any other layer such as an antiferromagnetic layer. FIG. 1 illustrates an example in which the free layer 53 is disposed on top of the nonmagnetic conductive layer 52, and the pinned layer 51 is disposed below the nonmagnetic conductive layer 52. However, the free layer 53 may be disposed below the nonmagnetic conductive layer 52, and the pinned layer 51 may be disposed on the nonmagnetic conductive layer 52.

The MR element 5 is formed by forming films to be the layers 51, 52 and 53 one by one, and patterning the layered structure made up of these films. The layered structure may be patterned by, for example, forming a mask on the layered structure by photolithography, and selectively etching the layered structure through dry etching such as ion milling, using the mask. The end 5d and the side portions 5e and 5f that are tilted are formed by this etching.

The nonmagnetic conductive layer 52 is made of a nonmagnetic conductive material such as Cu, Au or Ag. The free layer 53 includes one or more soft magnetic layers.

The pinned layer 51 may incorporate two ferromagnetic layers and a thin coupling layer disposed between the ferromagnetic layers, for example. In this case, the two ferromagnetic layers are coupled to each other antiferromagnetically, that is, in such a manner that the directions of magnetization in the ferromagnetic layers are anti-parallel. The coupling layer is made of a nonmagnetic material such as Ru, Rh, Ir, Re, Cr or Zr. The pinned layer 51 is not limited to the one having such a three-layer structure, but may be made up of a single ferromagnetic layer having a great magnetic coercive force. In the embodiment, the ferromagnetic layer incorporated in the pinned layer 51 is made of a ferromagnetic material having a positive magnetostriction constant. This ferromagnetic material may be a metal or an alloy. The material having a positive magnetostriction constant may be FeCo (70 weight % Fe and 30 weight % Co) or SmCo, for example.

The pinned layer 51 is given an induced magnetic anisotropy by being magnetized, and the direction of magnetization in the pinned layer 51 is fixed to the direction orthogonal to the air bearing surface 20.

In the embodiment, each of the bottom shield gap film 4 and the top shield gap film 7 has a compressive stress of 600 MPa or greater. However, if the compressive stress of each of the films 4 and 7 is too great, the adhesiveness of the films 4 and 7 to the layers touching the films 4 and 7 is reduced. Therefore, it is preferable that the compressive stress of each of the films 4 and 7 be 4000 MPa or smaller.

The bottom shield gap film 4 and the top shield gap film 7 may be made of a material containing any of $SiO_2$, SiC, SiN, AlN, TiO and BN. The bottom shield gap film 4 and the top shield gap film 7 may be each made of a multi-layer film.

The bottom shield gap film 4 and the top shield gap film 7 may be formed by sputtering, for example. A compressive stress often remains in an insulating film formed by sputtering. However, the magnitude of the compressive stress varies, depending on the material of the insulating film and the conditions for forming the film. Therefore, it is required to choose the material of the films 4 and 7 and to determine the conditions for forming the films 4 and 7 so as to form the films 4 and 7 each having a compressive stress of 600 MPa or greater. The material of the films 4 and 7 may contain any of $SiO_2$, SiC, SiN, AlN, TiO and BN. By using such a material, it is possible to form the films 4 and 7 each having a compressive stress of 600 MPa or greater, depending on the conditions for forming the films 4 and 7. When the films 4 and 7 are formed by sputtering, the conditions for forming the films 4 and 7 affect the residual stress in the films 4 and 7, the conditions including the flow rates of a plurality of gases used, the pressures of the gases, the power supplied to the target, and the power supplied to the substrate. It is therefore required to control one or more of these conditions so that the films 4 and 7 each have a compressive stress of 600 MPa or greater.

The operation of the thin-film magnetic head of the embodiment will now be described. The thin-film magnetic head writes data on a recording medium by using the write head and reads data written on the recording medium by using the read head.

In the read head, when no external magnetic field is applied to the free layer 53, the direction of magnetization in the free layer 53 is directed to the direction X of track width by the bias magnetic field sent from the bias field applying layers 18. On the other hand, the direction of magnetization in the pinned layer 51 is fixed to the direction Y orthogonal to the air bearing surface 20. Consequently, when no signal magnetic field sent from the recording medium is applied to the free layer 53, an angle of 90 degrees is maintained between the direction of magnetization in the pinned layer 51 and the direction of magnetization in the free layer 53. If a signal field in the direction orthogonal to the air bearing surface 20 is sent from the recording medium and applied to the read head, the direction of magnetization in the free layer 53 is changed, and the angle between the direction of magnetization in the pinned layer 51 and the direction of magnetization in the free layer 53 is thereby changed. The electrical resistance of the MR element 5 is changed by this angle. Therefore, it is possible to read data stored on the medium by detecting the change in electrical resistance of the MR element 5. It is possible to obtain the electrical resistance of the MR element 5 from the potential difference between the two electrode layers 6 when a sense current is fed to the MR element 5.

In the embodiment, the pinned layer 51 incorporates a layer made of a ferromagnetic material having a positive magnetostriction constant. In addition, each of the bottom shield gap film 4 adjacent to the first surface 5a of the MR element 5 and the top shield gap film 7 adjacent to the second surface 5b of the MR element 5 has a compressive stress of 600 MPa or greater. Consequently, a great tensile stress is applied to the pinned layer 51. As a result, a magnetic anisotropy that directs the magnetization to the direction orthogonal to the air bearing surface 20 is enhanced by the inverse magnetostrictive effect in the pinned layer 51 incorporating the layer made of a ferromagnetic material having a positive magnetostriction constant. The fixing of the direction of magnetization in the pinned layer 51 is thereby enhanced. In such a manner, according to the thin-film magnetic head of the embodiment, it is possible to enhance the fixing of the direction of magnetization in the pinned layer 51 while using the spin-valve MR element 5 incorporating the pinned layer 51 in which the direction of magnetization is fixed independently of the function of any other layer.

The result of experiment performed for confirming the effect of the embodiment will now be described. In the experiment, read heads of first and second examples of the embodiment and reference read heads were fabricated. The configuration of each of the read heads is the one illustrated in FIG. 1 and FIG. 2.

For each of the read heads of the first example of the embodiment, the bottom shield gap film 4 and the top shield gap film 7 were made of $SiO_2$ and formed by the following method. The method of forming the films was electron cyclotron resonance (ECR) sputtering. The target material was Si. The gas was a mixed gas of Ar and $O_2$. The flow rates of the gas were 20 sccm for Ar and 5 sccm for $O_2$. The pressure of the mixed gas was $8\times10^{-2}$ Pa. The microwave power was 500 W, and the power supplied to the target was 500 W.

For each of the read heads of the second example of the embodiment, the bottom shield gap film 4 and the top shield gap film 7 were made of $SiO_2$ and formed by the following method. The method of forming the films was ECR sputtering. The target material was Si. The gas was a mixed gas of Ar and $O_2$. The flow rates of the gas were 20 sccm for Ar and 10 sccm for $O_2$. The pressure of the mixed gas was $1.0\times10^{-1}$ Pa. The microwave power was 500 W, and the power supplied to the target was 500 W.

For each of the reference read heads, the bottom shield gap film 4 and the top shield gap film 7 were made of alumina ($Al_2O_3$) and formed by the following method. The method of forming the films was ECR sputtering. The target material was Al. The gas was a mixed gas of Ar and $O_2$. The flow rates of the gas were 20 sccm for Ar and 5 sccm for $O_2$. The pressure of the mixed gas was $8\times10^{-2}$ Pa. The microwave power was 500 W, and the power supplied to the target was 500 W.

The internal stress in each of the films 4 and 7 of each of the read heads of the first example of the embodiment was a compressive stress of 600 MPa. The internal stress in each of the films 4 and 7 of each of the read heads of the second example of the embodiment was a compressive stress of 900 MPa. On the other hand, the internal stress in each of the films 4 and 7 of each of the reference read heads was a compressive stress of 300 MPa.

A plurality of read heads of the first and second examples of the embodiment and reference read heads were fabricated through the use of a respective single wafer at the same time in the following manner. First, the read heads were fabricated such that a plurality of rows of the heads were arranged on the wafer. However, at that time, the pinned layers 51 and the bias field applying layers 18 were not magnetized yet. Next, the wafer was cut into bar-shaped blocks in each of which a plurality of read heads were arranged in a row. Each of the blocks had a surface in which the surface to be the air bearing surfaces 20 of the read heads appeared. Next, this surface of each of the blocks was lapped to form the air bearing surfaces 20 of the read heads. Next, the pinned layers 51 were magnetized by applying a magnetic field of 5 kOe (5×79.6 kA/m) in the direction orthogonal to the air bearing surfaces 20 to the pinned layers 51 located in each of the blocks. Through this magnetizing, the magnetization in the pinned layers 51 was directed to the direction orthogonal to the air bearing surfaces 20. Next, the bias field applying layers 18 were magnetized by applying a magnetic field of 1.5 kOe (1.5×79.6 kA/m) in the direction of track width to the layers 18. Through this magnetizing, the magnetization in the layers 18 was directed to the direction of track width. In the manner as described above, a hundred of the read heads of the first example of the embodiment, a hundred of the read heads of the second example of the embodiment, and a hundred of the reference read heads were fabricated.

In the experiment, measurements as will be described were performed on the hundred of read heads of the first example, the hundred of read heads of the second example, and the hundred of reference read heads to examine the intensity of fixing of the direction of magnetization in the pinned layers 51. In the measurements, first, a quasi-static test was performed on the read heads that each of the blocks included, so as to examine the outputs of the read heads. This test was performed by applying an alternate external magnetic field of −200 to 200 Oe (−200×79.6 A/m to 200×79.6 A/m) to the read heads in the direction orthogonal to the air bearing surfaces 20. Next, a disturbance magnetic field of 1.7 kOe (1.7×79.6 kA/m) was applied to each of the read heads in the direction of track width, and the application of the disturbance field was then stopped and the quasi-static test as described above was performed to examine the outputs of the read heads. The same test was repeated by increasing the magnitude of the disturbance field by 0.2 kOe (0.2×79.6 kA/m) until the magnitude of the disturbance field reached 4.1 kOe (4.1×79.6 kA/m).

Figure 9:
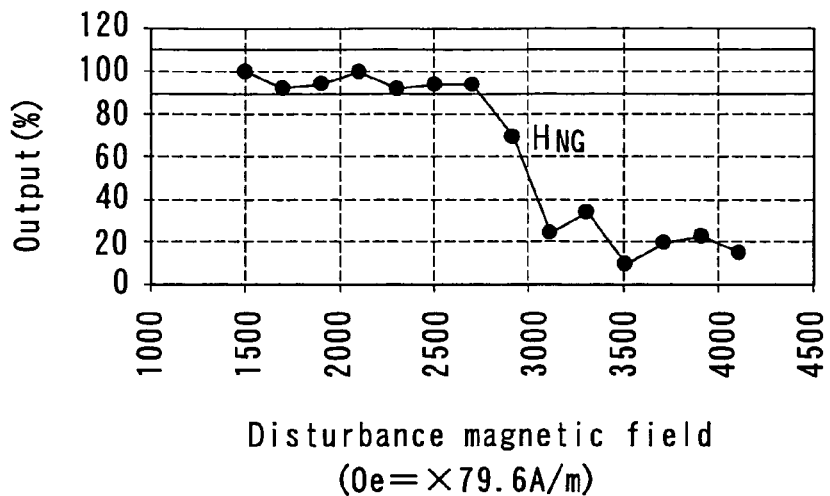
FIG. 9 is a plot showing the result of an experiment performed for confirming the effect of the first embodiment of the invention.

In the experiment, the read head whose output was reduced by 10% or greater of a desired value was rated as a nonconforming (failed) head. The desired value of the experiment was 1000 μV. FIG. 9 shows an example of the relationship between the disturbance field and the output of one of the read heads. In FIG. 9, the horizontal axis indicates the disturbance field and the vertical axis indicates the output (%) of the read head where a desired output is assumed as 100%. For the read head of this example, the output obtained in the first test performed after the head had been fabricated was 100%. In this example, the output was reduced by 10% or greater of the desired value when the disturbance field was increased and reached 2.9 kOe (2.9×79.6 kA/m). At that time, it is assumed that the direction of magnetization in the pinned layer 51 was tilted with respect to the direction orthogonal to the air bearing surface 20. In the experiment, as thus described, when the disturbance field was increased and the output was reduced by 10% or greater of the desired value for the first time, the disturbance field at that point in time was defined as failure developing field $H_{NG}$.

Figure 10:
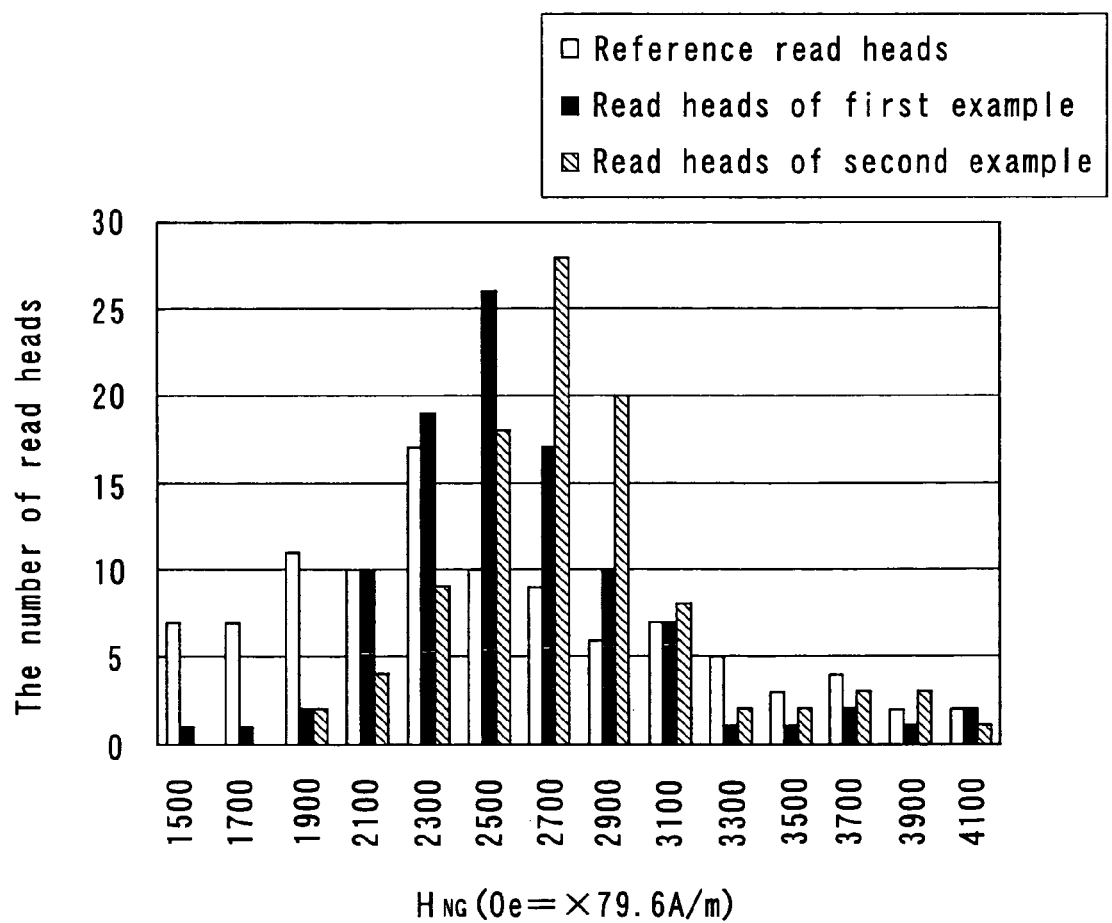
FIG. 10 is a plot showing the result of the experiment performed for confirming the effect of the first embodiment of the invention.

FIG. 10 shows the result of determining the distributions of failure developing fields $H_{NG}$ for the hundred of read heads of the first example of the embodiment, the hundred of read heads of the second example of the embodiment, and the hundred of reference read heads. In FIG. 10, the horizontal axis indicates the failure developing fields $H_{NG}$ and the vertical axis indicates the number of read heads. According to the result shown in FIG. 10, there also exist read heads of which the failure developing fields $H_{NG}$ are 1.5 kOe (1.5×79.6 kA/m). These heads are such heads that a reduction in output of 10% or grater was observed in the first test performed after the fabrication of the heads.

The following findings are obtained from the result shown in FIG. 10. First, among the hundred of reference read heads, there exist 17 read heads of which the failure developing field $H_{NG}$ is 2.3 kOe (2.3×79.6 kA/m), which are the largest in number among the reference read heads. Among the reference read heads, there exist 84 read heads of which the failure developing fields $H_{NG}$ fall within the range of 1.5 kOe (1.5× 79.6 kA/m) to 3.1 kOe (3.1×79.6 kA/m). This indicates that variations in failure developing fields $H_{NG}$ are great in the reference read heads. Furthermore, among the reference read heads, there exist seven read heads of which the failure developing field $H_{NG}$ is 1.5 kOe (1.5×79.6 kA/m). These seven read heads are those made into nonconforming ones because the directions of magnetization in the pinned layers 51 were tilted with respect to the direction orthogonal to the air bearing surface 20 due to magnetizing of the bias field applying layers 18.

Among the hundred of read heads of the first example of the embodiment, there exist 26 read heads of which the failure developing field $H_{NG}$ is 2.5 kOe (2.5×79.6 kA/m), which are the largest in number among the read heads of the first example. Among the read heads of the first example, there exist 82 read heads of which the failure developing fields $H_{NG}$ fall within the range of 2.1 kOe (2.1×79.6 kA/m) to 2.9 kOe (2.9×79.6 kA/m). This indicates that, in the read heads of the first example, variations in failure developing fields $H_{NG}$ are smaller and the distribution of the failure developing fields $H_{NG}$ are shifted to the greater fields as compared with the reference read heads. Furthermore, among the read heads of the first example, there exist only one read head of which the failure developing field $H_{NG}$ is 1.5 kOe (1.5×79.6 kA/m).

Among the hundred of read heads of the second example of the embodiment, there exist 28 read heads of which the failure developing field $H_{NG}$ is 2.7 kOe (2.7×79.6 kA/m), which are the largest in number among the read heads of the second example. Among the read heads of the second example, there exist 83 read heads of which the failure developing fields $H_{NG}$ fall within the range of 2.3 kOe (2.3×79.6 kA/m) to 3.1 kOe (3.1×79.6 kA/m). This indicates that, in the read heads of the second example, variations in failure developing fields $H_{NG}$ are smaller and the distribution of the failure developing fields $H_{NG}$ are shifted to the greater fields as compared with the reference read heads. Furthermore, among the read heads of the second example, there exists no read head of which the failure developing field $H_{NG}$ is 1.5 kOe (1.5×79.6 kA/m).

These findings indicate that the fixing of the directions of magnetization in the pinned layers 51 is enhanced in the read heads of the first and second examples of the embodiment, compared with the reference read heads. This also teaches that it is possible to enhance the fixing of the direction of magnetization in the pinned layer 51 by increasing the compressive stress in the films 4 and 7.

Figure 5:
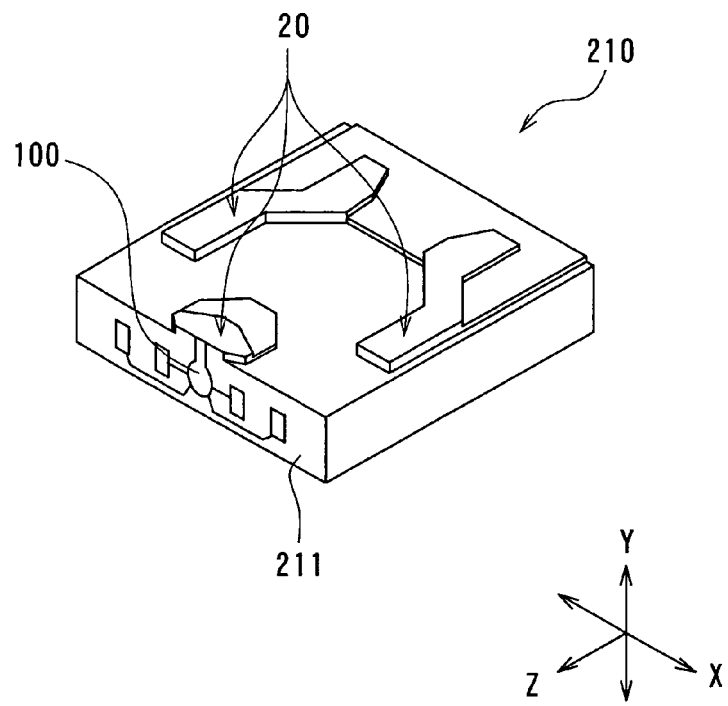
FIG. 5 is a perspective view illustrating a slider incorporated in a head gimbal assembly of the first embodiment of the invention.

A head gimbal assembly and a hard disk drive of the embodiment will now be described. Reference is made to FIG. 5 to describe a slider 210 incorporated in the head gimbal assembly. In the hard disk drive, the slider 210 is placed to face toward a hard disk platter that is a circular-plate-shaped recording medium to be rotated and driven. The slider 210 has a base body 211 made up mainly of the substrate 1 and the overcoat layer 17 of FIG. 3. The base body 211 is nearly hexahedron-shaped. One of the six surfaces of the base body 211 faces toward the hard disk platter. The air bearing surface 20 is formed in this one of the surfaces. When the hard disk platter rotates in the Z direction of FIG. 5, an airflow passes between the hard disk platter and the slider 210 and a lift is thereby generated below the slider 210 in the Y direction of FIG. 5 and exerted on the slider 210. The slider 210 flies over the hard disk platter by means of the lift. The X direction of FIG. 5 is across the tracks of the hard disk platter. A thin-film magnetic head 100 of the embodiment is formed near the air-outflow-side end (the end located at the lower left of FIG. 5) of the slider 210.

Figure 6:
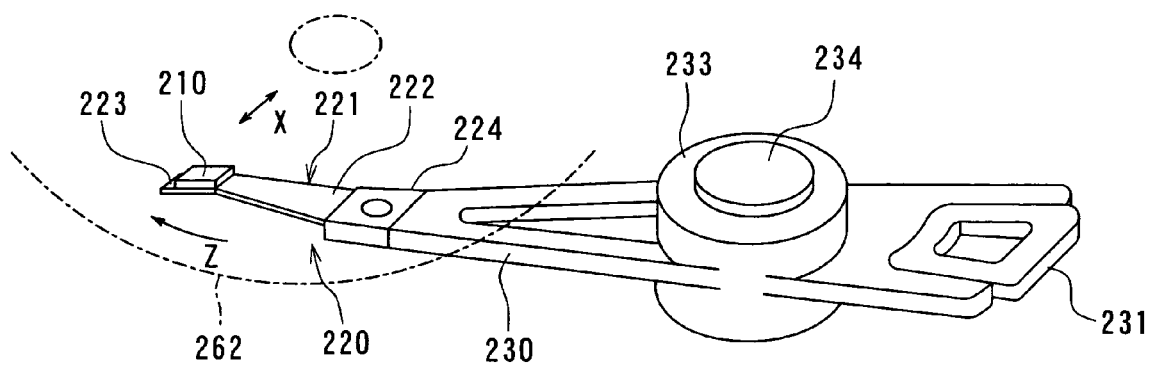
FIG. 6 is a perspective view illustrating a head arm assembly including the head gimbal assembly of the first embodiment of the invention.

Reference is now made to FIG. 6 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the X direction across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 6 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 7:
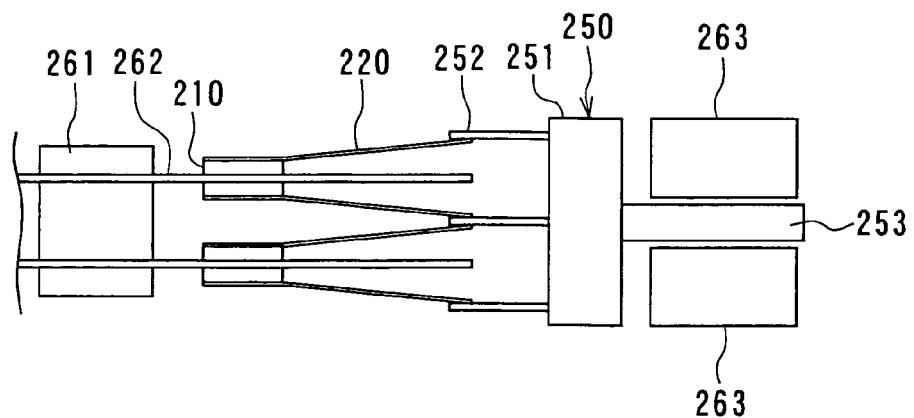
FIG. 7 is a view for illustrating a main part of a hard disk drive of the first embodiment of the invention.
Figure 8:
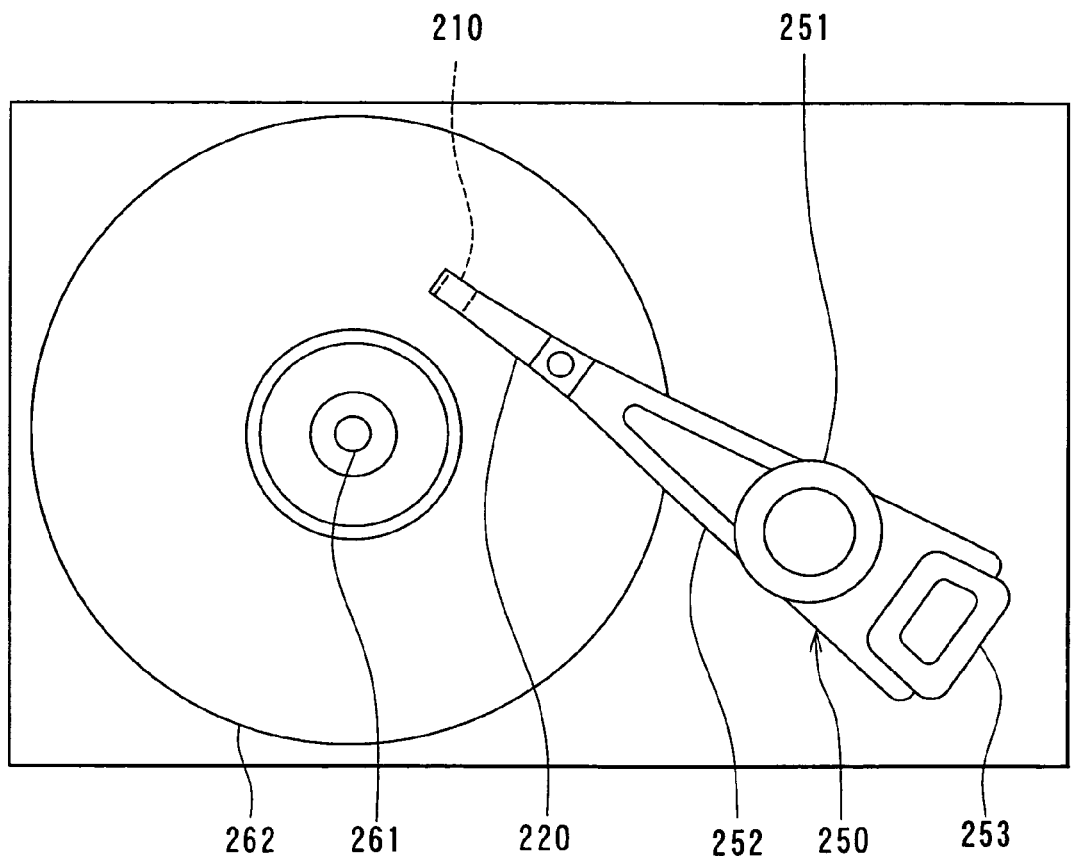
FIG. 8 is a top view of the hard disk drive of the first embodiment of the invention.

Reference is now made to FIG. 7 and FIG. 8 to describe an example of the head stack assembly and the hard disk drive of the embodiment. FIG. 7 illustrates the main part of the hard disk drive. FIG. 8 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the hard disk platters 262.

In the hard disk drive of the embodiment, the actuator moves the slider 210 across the tracks of the hard disk platter 262 and aligns the slider 210 with respect to the hard disk platter 262. The thin-film magnetic head incorporated in the slider 210 writes data on the hard disk platter 262 through the use of the write head and reads data stored on the hard disk platter 262 through the use of the read head.

The head gimbal assembly and the hard disk drive of the embodiment exhibit effects similar to those of the foregoing thin-film magnetic head of the embodiment.

Second Embodiment

Figure 11:
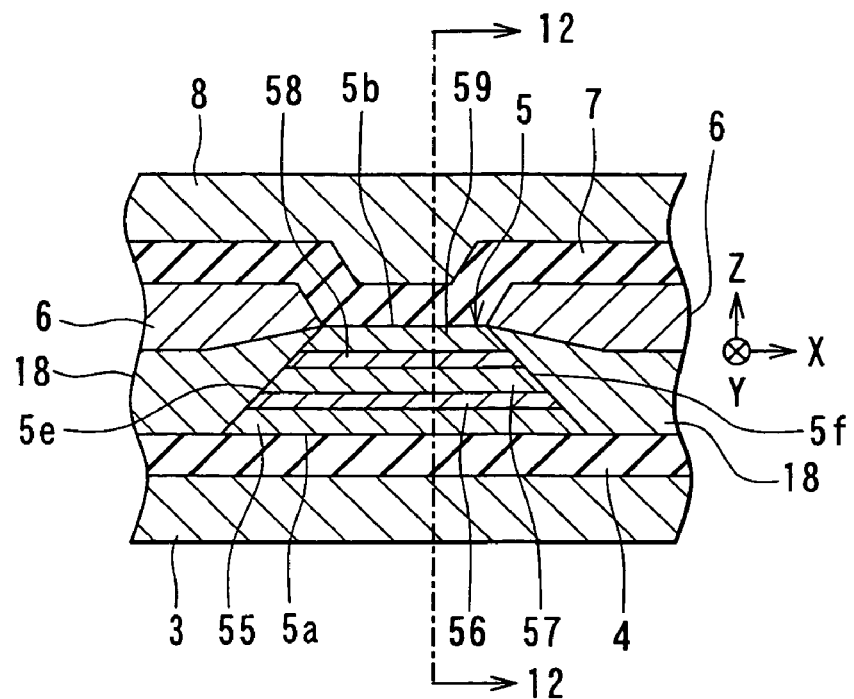
FIG. 11 is a cross-sectional view of a read head of a second embodiment of the invention, wherein the cross section is parallel to the air bearing surface.
Figure 12:
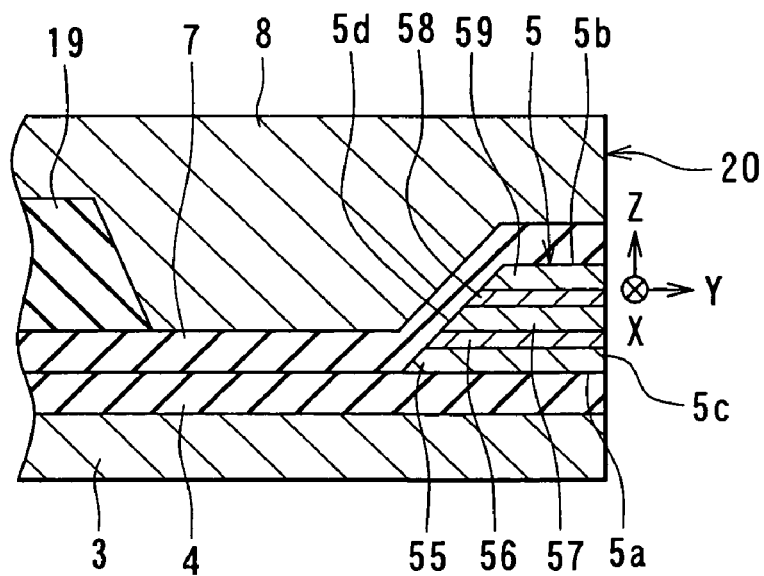
FIG. 12 is a cross-sectional view taken along line 12-12 of FIG. 11.

Reference is now made to FIG. 11 and FIG. 12 to describe a second embodiment of the invention. FIG. 11 is a cross-sectional view of the read head of the second embodiment, wherein the cross section is parallel to the air bearing surface. FIG. 12 is a cross-sectional view taken along line 12-12 of FIG. 11.

In the second embodiment, the MR element 5 has a configuration of a dual spin-valve GMR element, which is different form the configuration of the MR element 5 of the first embodiment. In the second embodiment, the MR element 5 incorporates a free layer 57, a first nonmagnetic conductive layer 56, a second nonmagnetic conductive layer 58, a first pinned layer 55 and a second pinned layer 59. However, as in the first embodiment, the MR element 5 does not include any other layer for fixing the direction of magnetization in each of the pinned layers 55 and 59, such as an antiferromagnetic layer. The direction of magnetization in each of the pinned layers 55 and 59 is fixed independently of the function of any other layer such as an antiferromagnetic layer.

The free layer 57 has two surfaces facing toward opposite directions. The first nonmagnetic conductive layer 56 has two surfaces facing toward opposite directions, and is disposed such that one of the surfaces (the top surface) is adjacent to one of the surfaces (the bottom surface) of the free layer 57. The second nonmagnetic conductive layer 58 has two surfaces facing toward opposite directions, and is disposed such that one of the surfaces (the bottom surface) is adjacent to the other of the surfaces (the top surface) of the free layer 57. The first pinned layer 55 is disposed adjacent to the other of the surfaces (the bottom surface) of the first nonmagnetic conductive layer 56. The second pinned layer 59 is disposed adjacent to the other of the surfaces (the top surface) of the second nonmagnetic conductive layer 58.

The materials and functions of the free layer 57, the nonmagnetic conductive layers 56 and 58, and the pinned layers 55 and 59 are the same as those of the free layer 53, the nonmagnetic conductive layer 52 and the pinned layer 51 of the first embodiment. The operation of the MR element 5 is the same as that of the first embodiment. According to the second embodiment, it is possible to make the rate of change in resistance of the MR element 5 greater, compared with the first embodiment.

The remainder of configuration, operations and effects of the second embodiment are similar to those of the first embodiment.

The present invention is not limited to the foregoing embodiments but may be practiced in still other ways. For example, although each of the bottom shield gap film 4 and the top shield gap film 7 has a compressive stress of 600 MPa or greater in the embodiments, only one of the films 4 and 7 may have a compressive stress of 600 MPa or greater. In this case, too, it is possible to give a great tensile stress to the pinned layer, and the fixing of the direction of magnetization in the pinned layer is thereby enhanced.

The MR element 5 may be a dual spin-valve GMR element in which one of the two pinned layers is such a layer that the direction of magnetization therein is fixed independently of the function of any other layer such as an antiferromagnetic layer, and the other of the pinned layers is such a layer that the direction of magnetization therein is fixed by the function of another layer such as an antiferromagnetic layer.

In the foregoing embodiments, the thin-film magnetic head is disclosed, comprising the read head formed on the base body and the write head stacked on the read head. Alternatively, the read head may be stacked on the write head.

The thin-film magnetic head may have a configuration comprising the read head only if the thin-film magnetic head is dedicated to reading.

Obviously many modifications and variations of the present invention are possible in the light of the above teachings. It is therefore to be understood that within the scope of the appended claims the invention may be practiced otherwise than as specifically described.

What is claimed is:
1. A thin-film magnetic head comprising:
    a medium facing surface that faces toward a recording medium;
    a magnetoresistive element disposed near the medium facing surface and having a first surface and a second surface that face toward opposite directions and intersect the medium facing surface; and
    an insulating film disposed adjacent to the first or second surface of the magnetoresistive element, wherein:
    the magnetoresistive element incorporates: a nonmagnetic conductive layer having two surfaces facing toward opposite directions; a free layer disposed adjacent to one of the surfaces of the nonmagnetic conductive layer, wherein a direction of magnetization in the free layer changes in response to an external magnetic field; and a pinned layer disposed adjacent to the other of the surfaces of the nonmagnetic conductive layer, wherein a direction of magnetization in the pinned layer is fixed to a direction orthogonal to the medium facing surface independently of a function of any other layer;
    the pinned layer incorporates a layer made of a ferromagnetic material having a positive magnetostriction constant; and
    the insulating film has a compressive stress of 600 MPa or greater.

2. The thin-film magnetic head according to claim 1, wherein the direction of magnetization in the free layer is directed to a direction of track width while no external magnetic field is applied to the free layer.

3. The thin-film magnetic head according to claim 1, wherein the insulating film contains any of $SiO_2$, SiC, SiN, AN, TiO and BN as a material thereof.

4. The thin-film magnetic head according to claim 1, wherein:
    the magnetoresistive element incorporates: the free layer; a first nonmagnetic conductive layer and a second nonmagnetic conductive layer as the nonmagnetic conductive layer; and a first pinned layer and a second pinned layer;
    the free layer has two surfaces facing toward opposite directions;
    the first nonmagnetic conductive layer has two surfaces facing toward opposite directions, and is disposed such that one of the surfaces is adjacent to one of the surfaces of the free layer;
    the second nonmagnetic conductive layer has two surfaces facing toward opposite directions, and is disposed such that one of the surfaces is adjacent to the other of the surfaces of the free layer;
    the first pinned layer is disposed adjacent to the other of the surfaces of the first nonmagnetic conductive layer;
    the second pinned layer is disposed adjacent to the other of the surfaces of the second nonmagnetic conductive layer; and
    at least one of the first and second pinned layers is such a pinned layer that a direction of magnetization therein is fixed to the direction orthogonal to the medium facing surface independently of a function of any other layer.

5. A head gimbal assembly comprising:
    a slider incorporating a thin-film magnetic head and disposed to face toward a recording medium; and
    a suspension flexibly supporting the slider, the thin-film magnetic head comprising:
    a medium facing surface that faces toward the recording medium;
    a magnetoresistive element disposed near the medium facing surface and having a first surface and a second surface that face toward opposite directions and intersect the medium facing surface; and
    an insulating film disposed adjacent to the first or second surface of the magnetoresistive element, wherein:

the magnetoresistive element incorporates: a nonmagnetic conductive layer having two surfaces facing toward opposite directions; a free layer disposed adjacent to one of the surfaces of the nonmagnetic conductive layer, wherein a direction of magnetization in the free layer changes in response to an external magnetic field; and a pinned layer disposed adjacent to the other of the surfaces of the nonmagnetic conductive layer, wherein a direction of magnetization in the pinned layer is fixed to a direction orthogonal to the medium facing surface independently of a function of any other layer;

the pinned layer incorporates a layer made of a ferromagnetic material having a positive magnetostriction constant; and the insulating film has a compressive stress of 600 MPa or greater.

6. A hard disk drive comprising:

a slider incorporating a thin-film magnetic head and disposed to face toward a circular-plate-shaped recording medium that is rotated and driven; and an alignment device supporting the slider and aligning the slider with respect to the recording medium, the thin-film magnetic head comprising:

a medium facing surface that faces toward the recording medium;

a magnetoresistive element disposed near the medium facing surface and having a first surface and a second surface that face toward opposite directions and intersect the medium facing surface; and an insulating film disposed adjacent to the first or second surface of the magnetoresistive element, wherein:

the magnetoresistive element incorporates: a nonmagnetic conductive layer having two surfaces facing toward opposite directions; a free layer disposed adjacent to one of the surfaces of the nonmagnetic conductive layer, wherein a direction of magnetization in the free layer changes in response to an external magnetic field; and a pinned layer disposed adjacent to the other of the surfaces of the nonmagnetic conductive layer, wherein a direction of magnetization in the pinned layer is fixed to a direction orthogonal to the medium facing surface independently of a function of any other layer;

the pinned layer incorporates a layer made of a ferromagnetic material having a positive magnetostriction constant; and the insulating film has a compressive stress of 600 MPa or greater.

* * * * *